May 2, 1950 H. P. TAYLOR ET AL 2,505,923
TREE OR BRUSH PULLER ATTACHMENT FOR TRACTORS
Filed Sept. 10, 1948 2 Sheets-Sheet 1

Inventors
Horace P. Taylor
Charles F. Oliver.

ATTORNEY

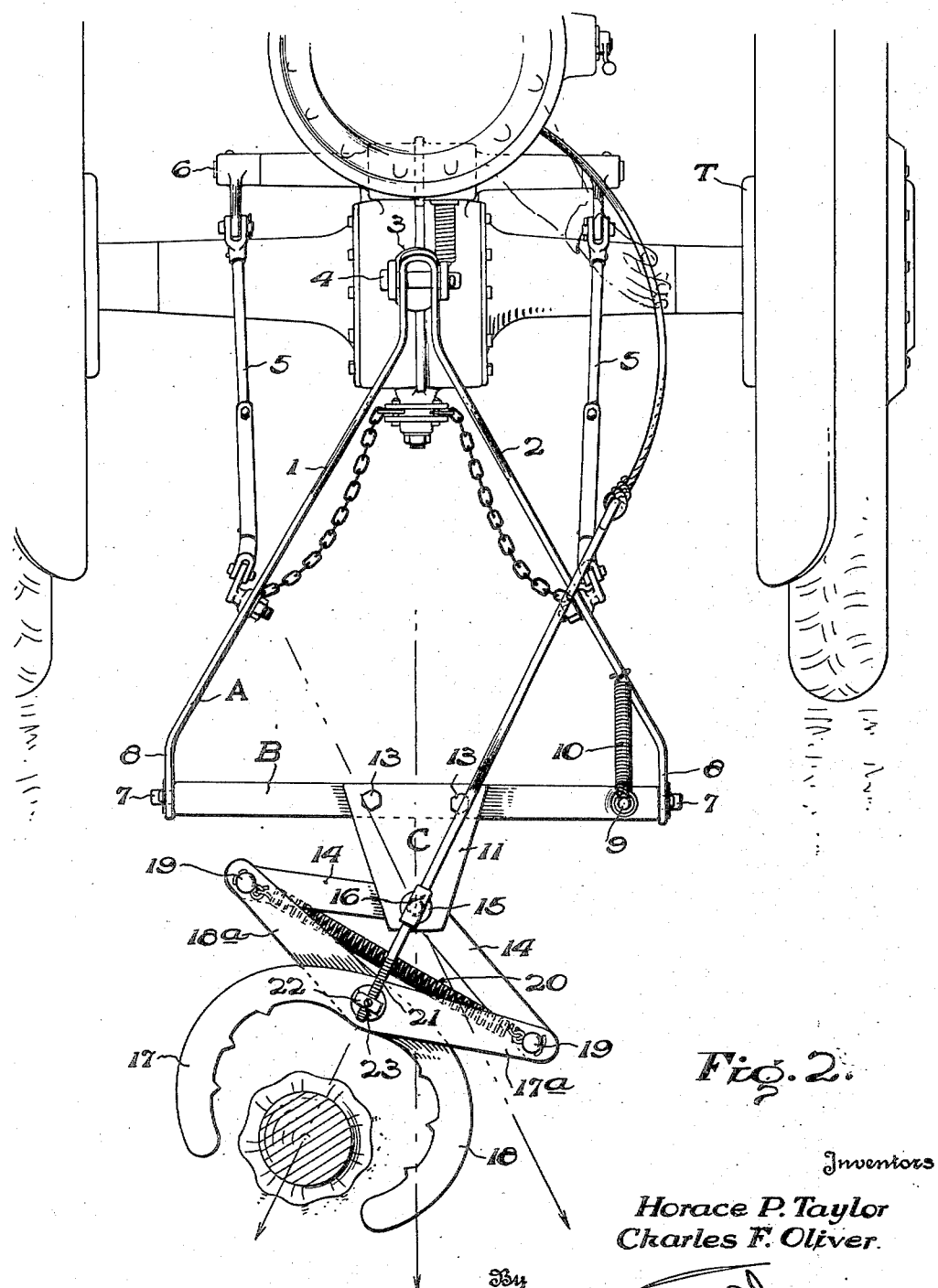
Fig. 2.
Inventors
Horace P. Taylor
Charles F. Oliver.
By 
ATTORNEY Patented May 2, 1950

2,505,923

UNITED STATES PATENT OFFICE 2,505,923

TREE OR BRUSH PULLER ATTACHMENT FOR TRACTORS

Horace P. Taylor and Charles F. Oliver, Paces, Va.

Application September 10, 1948, Serial No. 48,703

5 Claims. (Cl. 37—2)

This invention relates to tree or brush puller attachment for tractors or the like.

A primary object of the invention is to provide an attachment for farm vehicles, more particularly tractors, which will enable the operator of the tractor to pull trees or brush from the earth without having to dismount from the tractor seat to engage the tree or brush as the tractor is maneuvered into position, nor likewise to dismount after the tree or brush has been pulled. In other words, it is proposed to provide a pulling attachment wherein the jaws which engage the tree or brush are dirigible or swingable, in a lateral plane, to enable the jaws to be positioned in relative angular relation to the rear of the tractor, for example, to back up to a selected tree and to enable the operator to open the jaws to admit a tree thereto prior to gripping and pulling; and thereafter permit the jaws to be again opened after the tree or brush has been pulled to disengage the same and permit the tractor to go on its way.

Another object of the invention is to provide a tractor attachment including a frame adapted to be raised and lowered by hydraulic or other means on the tractor itself and which carries a bracket having appropriate linkage and jaws which may be readily positioned by the operator through appropriate manipulation of a slidable and swiveled control rod, in the nature of a tiller, which may optionally have a rope or other flexible connection at its end to assist the operator in effecting sliding movement thereof to control opening of the jaws.

A further object of the invention is to provide a construction which may be readily and economically manufactured and which is of rugged and sturdy construction to readily withstand the loads and strains imposed thereon in the pulling operation.

With the above and other objects in view, which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings, in which:

Figure 2 is a top plan view of the construction shown in Figure 1;

Figure 3 is a detail vertical sectional view taken on the line 3—3 of Figure 1;

Figure 4 is a detail vertical sectional view taken on the line 4—4 of Figure 1.

Figure 1:
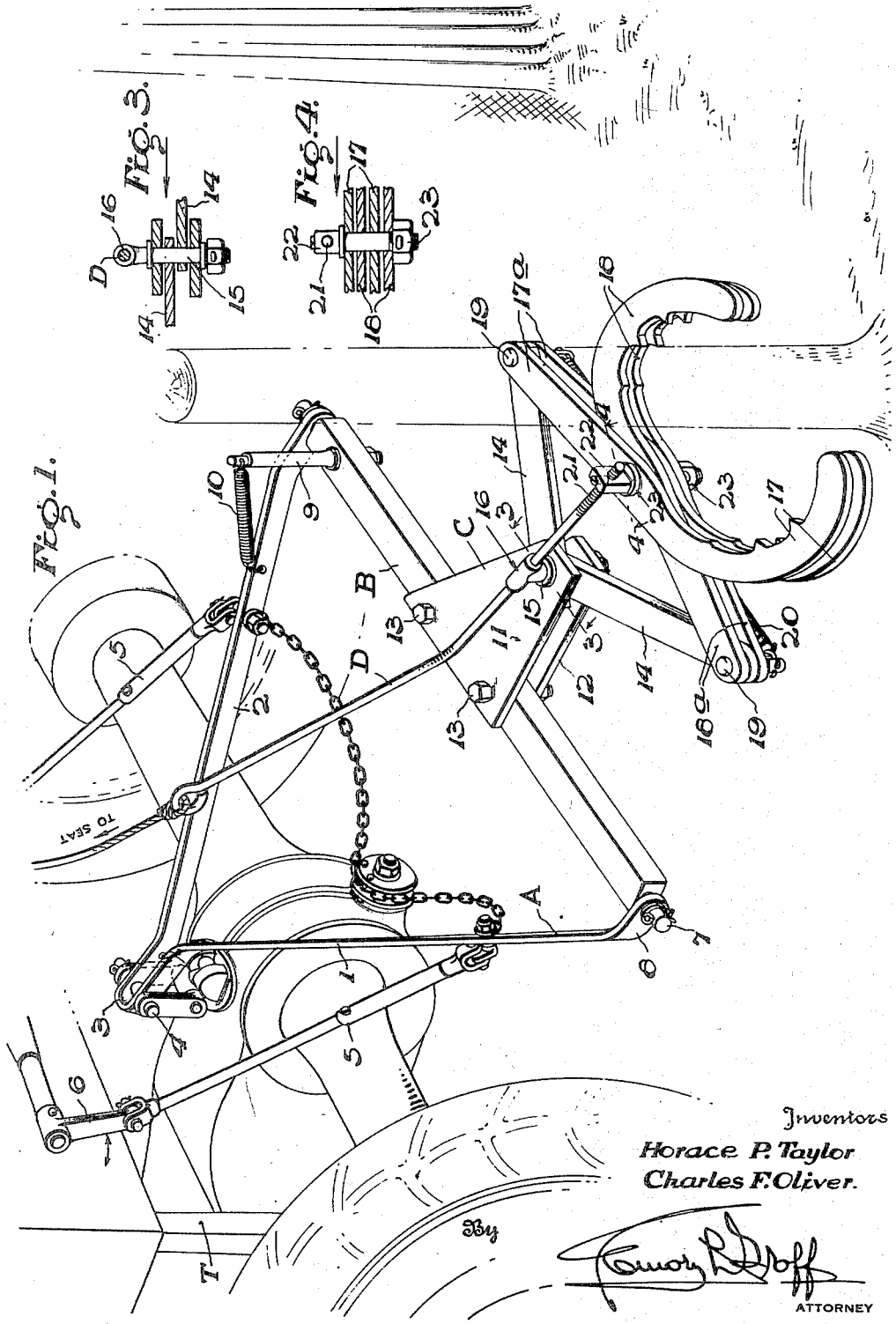
Figure 1 is a perspective view of the puller attachment applied to the rear of a tractor and so positioned with reference to a tree to be pulled as to have the gripping jaws open to receive the tree.

As will be observed from the drawings, the tractor is designated generally as T, and may be of any conventional type. The puller attachment essentially comprises a frame A, draw bar B, and bracket C for supporting appropriate link and jaw members adapted to be controlled in their lateral movements as well as in their opening and closing movements by the control rod D.

Referring first to the frame A, the same preferably includes the side members 1 and 2 which diverge from a substantially U-shaped supporting portion 3 pivotally mounted as at 4 on the tractor so that the outer or rear ends of said side members 1 and 2 may be raised and lowered through the medium of lifting arms 5—5. These arms may be in turn connected to the crank portion 6 on a shaft controlled in any suitable manner by the operator, such, for example, as by power operated means or a lever, neither of which are shown because they are conventional equipment and do not constitute a part of the present invention. The main feature is that the rear end of the frame A, including the side members 1 and 2, may be raised and lowered over a substantially arcuate path on the pivots 4, thereby to control the elevation of the draw bar B whose trunnion portions 7 are journalled in suitable openings in the angular end portions 8 of the side members 1 and 2.

To prevent the draw bar B, which carries the bracket C, from rotating so that the bracket would drop down vertically or at an ineffective tree engaging angle, suitable means are provided between the said draw bar and the frame for maintaining the bar in a position which will normally cause the bracket C to lie in a substantially horizontal plane. In accordance with the example shown, this means consists of an upright member or post 9 rigidly carried by and radially projecting from the draw bar B at an angle substantially 90° to the bracket C, said post having its upper end connected by a coil spring 10 with the side member 2 of the frame A. It is pointed out that this arrangement not only stabilizes the position of the bracket C, but also serves to provide a resilient mounting for the draw bar B so that in the event the bracket C is required to change its angular position with reference to the ground during the pulling operation, adequate provision is made for that purpose.

The bracket C preferably consists of the upper and lower plates 11 and 12, conveniently of substantially triangular formation, and secured by bolts 13 to opposite sides of the draw bar B, thereby to space them apart for accommodating the inner end portions of the links 14. That is to say, the inner end of the links 14 are superimposed between the said plates and provided with registering openings which also register with corresponding openings in the plates, thereby to receive an axis member or swivel bolt 15 which not only pivotally unites the levers 14—14 at their inner ends on a common axis, but also carries at its upper end a right angularly disposed tubular guide portion 16 for slidably receiving the control rod D. The swivel bolt 15 makes it possible for the control rod D to pivot on a vertical axis in response to horizontal swinging movement of the control rod D by the operator in order to more effectually adjust the position of the links 14 which connect with the gripping elements of the puller, and likewise permits the control rod D to slide longitudinally therein.

The gripping elements of the puller preferably consist of the opposite arcuate jaw members 17 and 18, respectively provided with tangentially offset arm portions 17ª and 18ª whose outer ends are pivotally connected to the related ends of the links 14 by pivot elements 19. Said pivot elements extend below the arms 17ª and 18ª to receive a tension spring 20 which normally tends to pull the ends of the links 14 which are connected with the arms 17ª and 18ª inwardly, or together, in order to cause the jaw members 17 and 18 normally to close about the tree or brush.

As will be apparent from the drawings, the gripping elements comprising the parts 17—18 and their arms 17ª and 18ª are preferably made of duplicate superimposed parts, not only for convenience in manufacture and assembly, but also to give greater strength to the gripping elements. It will also be seen that the inner portions of the arcuate gripping jaws 17 and 18 may be provided with suitable gripping teeth.

The control rod D which, as previously indicated, is slidable in the guide 16, has its outer end 21 adjustably secured, as by a set screw, in an opening of the upstanding portion 22 of the bolt 23. This bolt forms a pivot for the scissors type gripping elements and is located substantially at the junction of the arcuate jaws 17—18 with their integral tangential arm portions 17ª and 18ª. It will thus be seen that the sliding movement of the control rod D toward the operator's seat in the guide 16 enables the operator to open the jaws 17 and 18 against the tension of the spring 20. As shown, this manipulation may be assisted by the operator grasping the flexible connection on the end of the rod.

The operation of the device is as follows:

Assuming that the frame A, pivoted as at 4, to the tractor, is swung upwardly or downwardly to locate the draw bar B and bracket C in the desired horizontal plane above the ground in order to enable the gripping jaws 17 and 18 to engage the trunk of a tree at the chosen location, it then only remains for the operator of the tractor, occupying the seat thereof, to swing the control rod D horizontally, either to the right or to the left, to change the relative angular position of the links 14 and jaws 17—18 relative to the tree to be pulled. This horizontal swinging movement of the gripping elements is made possible due to the fact that the control rod D is supported in the guide 16 on the swivel bolt or axis member 15. As previously indicated, the spring 20 normally contracts the links 14 so as to keep the jaws 17 and 18 closed. After the jaws 17 and 18 have been adjusted to tree engaging level and position, it is then only necessary for the operator to grasp the upper end of the control rod D, or its flexible connection, and pull it rearwardly, thereby opening the jaws 17—18 to receive the tree. Upon releasing the control rod D, the spring 20 will bring the jaws 17 and 18 to closed position, thereby gripping the tree. The tractor may then be driven forwardly to uproot the tree, brush or the like. After the tree or brush has been pulled, it is only necessary for the operator to again pull the control rod D and slide it through the guide 16 to force the jaws 17 and 18 open to release the pulled tree or brush.

From the foregoing, it is believed to be apparent that the present invention provides for readily manipulating the gripping elements in a horizontal position and also to open them against the force of the spring 20 by simply, in the first instance, swinging the control rod D, and, in the second instance, by sliding the same in the swivel guide 16. Since the whole pulling and releasing operation can be effected without the operator leaving the seat on the tractor, it will now be apparent that the operation of pulling may be simplified and expedited without assistance from any one other than the operator of the tractor. Thus, the present device saves time and labor and enables the tractor driver to accomplish a large amount of work in a relatively short space of time.

Without further description it is thought that the features and advantages of the present invention will be apparent to those skilled in the art, and it will, of course, be understood that changes in the form, proportions and details of construction may be resorted to without departing from the scope of the appended claims.

We claim:

1. A tree or brush puller attachment for tractors, comprising, in combination, a draw bar mounted on the tractor for relative vertical movement, a bracket projecting radially from the draw bar, means for supporting the draw bar and bracket yieldingly to maintain the bracket substantially horizontal, a pair of gripping jaws connected by a pivot and having arms connected by links to a common axis member on the bracket for movement in a horizontal plane, and a control rod slidably and swingably mounted on the bracket, said control rod having its outer end engaging the pivot connecting the jaws, whereby manual swinging of the said control rod on said axis member will change the angular position of the gripping jaws relative to the draw bar, and the outward sliding movement of the rod will open the jaws.

2. A tree or brush puller attachment for tractors, comprising, in combination, a frame supported on the tractor for relative vertical movement, a draw bar carried by the frame, a bracket projecting radially from the draw bar, a post projecting radially from the draw bar at an angle of 90° to the bracket, a tension spring connecting said post with a portion of said frame, thereby to maintain said bracket substantially horizontal and permit resilient angular movement thereof relative to the frame, a pair of gripping jaws connected by a pivot and having arms connected by links to a common axis member on the bracket for movement in a horizontal plane, and a control rod slidably and swingably mounted on the bracket, said control rod having its outer end engaging the pivot connecting the jaws, whereby manual swinging of the said control rod on said axis member will change the angular position of the gripping jaws relative to the draw bar, and the outward sliding movement of the rod will open the jaws.

3. A tree or brush puller attachment for tractors, comprising, in combination, a frame supported on the tractor for relative vertical movement, a draw bar carried by the frame, a bracket projecting radially from the draw bar and comprising upper and lower plates carried by opposite sides of the draw bar to provide a space therebetween, means connecting the draw bar and frame to maintain the bracket in a substantially horizontal position and permitting relative angular movement thereof, a pair of links having their inner ends disposed between said plates of the bracket, a swivel member connecting said inner ends of the links with the bracket, guide means carried by the upper portion of the swivel member, a pair of jaws of arcuate formation and having arm portions connecting with the outer ends of the links, a bolt located substantially at the junction of said arms with the arcuate jaws, a spring connected with the outer ends of the links for drawing the same toward each other and simultaneously drawing the jaws to closed position, and a control rod slidable in said guide means of the swivel member and connected at its outer end to the bolt which pivotally connects the jaws, whereby, upon imparting swinging movement to the free end of the control rod the angular position of the links and jaws may be angularly adjusted relative to the draw bar, and upon imparting sliding movement to said rod said arcuate jaws may be moved to open position against the tension of said spring.

4. A tree or brush puller attachment for tractors, comprising, in combination, a frame pivotally supported on the tractor whereby its outer end is adapted for relative vertical movement relative to the ground, a draw bar rotatably mounted in the frame, a bracket projecting radially rearwardly from the draw bar, spring means connecting the draw bar with the frame normally to hold the bracket horizontal, a pair of divergently related links, a swivel member mounted in the bracket and connecting the inner ends of said links on a common axis, a tubular guide carried by said swivel member, a pair of cooperating arcuate gripping jaws having oppositely extending arm portions whose outer ends are pivotally connected to the outer ends of the links, a bolt pivotally connecting the jaws substantially at the junction of said arm portions therewith, a spring connecting the end portions of the links which are pivoted to the jaw arms normally to bring the jaws together, and a control rod slidable in said guide and having its outer end connected to said bolt and having its inner end available for manual manipulation laterally to shift the position of the jaws relative to the draw bar and also to hold them open against the tension of said spring.

5. A tree or brush puller attachment for tractors, comprising, in combination, a draw bar carried by the tractor, a bracket carried by the draw bar, a swivel member mounted in the bracket and having guide means thereon, pantograph type gripping jaws including links whose overlapping inner ends pivot about the swivel member, and a control rod slidable in the said guide means and connected to said jaws, whereby, swinging movement imparted to the free end of the rod will laterally shift the angular position of both jaws relative to the draw bar and longitudinal movement imparted to the control rod will cause said gripping jaws to move relative to each other.

HORACE P. TAYLOR.
CHARLES F. OLIVER.

No references cited.